US012763663B2

(12) United States Patent
Wang et al.

(10) Patent No.: US 12,763,663 B2
(45) Date of Patent: Oct. 13, 2026

(54) SOFT SWITCH CIRCUIT AND CONTROL METHOD, AND POWER SOURCE ASSEMBLY

(71) Applicant: ZTE CORPORATION, Shenzhen (CN)

(72) Inventors: Linguo Wang, Shenzhen (CN); Wei Gao, Shenzhen (CN); Junjie Zhu, Shenzhen (CN); Zhongyin Guo, Shenzhen (CN); Hao Wang, Shenzhen (CN); Bin Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 170 days.

(21) Appl. No.: 18/726,082

(22) PCT Filed: Dec. 29, 2022

(86) PCT No.: PCT/CN2022/143310
§ 371 (c)(1),
(2) Date: Jul. 1, 2024

(87) PCT Pub. No.: WO2023/125781
PCT Pub. Date: Jul. 6, 2023

(65) Prior Publication Data

US 2025/0070638 A1 Feb. 27, 2025

(30) Foreign Application Priority Data

Dec. 31, 2021 (CN) ......................... 202111669206.X

(51) Int. Cl.
*H02M 1/00* (2007.01)
*H02M 1/34* (2007.01)
(Continued)

(52) U.S. Cl.
CPC ....... *H02M 1/0058* (2021.05); *H02M 1/0064* (2021.05); *H02M 1/342* (2021.05);
(Continued)

(58) Field of Classification Search
CPC ............. H02M 1/0051; H02M 1/0058; H02M 1/0064; H02M 1/342; H02M 3/156; H02M 3/158; H02M 3/33523; Y02B 70/10
See application file for complete search history.

(56) References Cited

U.S. PATENT DOCUMENTS 5,477,131 A 12/1995 Gegner
5,736,842 A 4/1998 Jovanovic
(Continued)

FOREIGN PATENT DOCUMENTS

CN 1950995 A 4/2007
CN 106712510 A 5/2017
(Continued)

OTHER PUBLICATIONS

Machine translation of JP 2016059267 (Univ Oita; Denso Corp). Obtained from https://worldwide.espacenet.com/ on Feb. 5, 2026. (Year: 2016).*
(Continued)

*Primary Examiner* — Fred E Finch, III
(74) *Attorney, Agent, or Firm* — Li & Cai Intellectual Property (USA) Office

(57) ABSTRACT

A soft switch circuit, comprising switch voltage end A, main inductor L and second voltage end B. Switch voltage end A is electrically connected to first end of main inductor L; and second voltage end B is electrically connected to second end of main inductor L. Soft switch circuit further comprises auxiliary module (100) and first voltage end C, wherein first end of auxiliary module (100) is electrically connected to
(Continued)

switch voltage end A; and second end of the auxiliary module (100) is electrically connected to first voltage end C. Auxiliary module (100) is used for charging auxiliary module (100) by using first voltage input by means of first voltage end C; and auxiliary module is further used for performing discharging to the switch voltage end A. Further provided are a power source assembly comprising a soft switch circuit, and a method for controlling a soft switch circuit.

16 Claims, 6 Drawing Sheets

(51) Int. Cl.
*H02M 3/156* (2006.01)
*H02M 3/335* (2006.01)

(52) U.S. Cl.
CPC ....... *H02M 3/156* (2013.01); *H02M 3/33573* (2021.05); *H02M 1/0051* (2021.05)

(56) References Cited

U.S. PATENT DOCUMENTS

| | | | | | |
|---|---|---|---|---|---|
| 2008/0100273 | A1* | 5/2008 | Uruno | H02M 1/4208<br>323/282 |
| 2010/0061122 | A1* | 3/2010 | Okubo | H02M 3/158<br>363/20 |
| 2013/0207626 | A1 | 8/2013 | Chiba | |
| 2017/0373592 | A1* | 12/2017 | Takahashi | H02M 3/07 |
| 2018/0323713 | A1* | 11/2018 | Beland | H02M 3/1582 |
| 2023/0029565 | A1* | 2/2023 | Yu | H02M 1/15 |

FOREIGN PATENT DOCUMENTS

| | | | |
|---|---|---|---|
| CN | 109217660 | A | 1/2019 |
| CN | 213185885 | U | 5/2021 |
| JP | 2006223008 | A | 8/2006 |
| JP | 2014522231 | A | 8/2014 |
| JP | 2016059267 | A | 4/2016 |
| JP | 2019092242 | A | 6/2019 |
| JP | 2021175306 | A | 11/2021 |

OTHER PUBLICATIONS

Machine translation of CN 213185885 (Guangzhou Inst Tech). Obtained from https://worldwide.espacenet.com/ on Feb. 5, 2026. (Year: 2021).*

Japan Patent Office, First Office Action (OA1) dated May 20, 2025, for corresponding JP application No. 2024-539873.

WIPO, International Search Report issued on Mar. 22, 2023.

* cited by examiner

SOFT SWITCH CIRCUIT AND CONTROL METHOD, AND POWER SOURCE ASSEMBLY

CROSS REFERENCE TO RELATED APPLICATIONS

The present disclosure is a National Phase Application filed under 35 U.S.C. 371 as a national stage of PCT/CN2022/143310, filed on Dec. 29, 2022 and claiming the priority to Chinese Patent Application No. 202111669206.X entitled "SOFT SWITCH CIRCUIT AND CONTROL METHOD, AND POWER SOURCE ASSEMBLY" and filed with the CNIPA on Dec. 31, 2021, the contents of which are incorporated herein by reference in their entirety.

TECHNICAL FIELD

Embodiments of the present disclosure relate to, but are not limited to, the field of microelectronic technology, and in particular, to a soft switch circuit and a control method thereof, and a power source assembly including the soft switch circuit.

BACKGROUND

Soft switch circuits can reduce a switching loss and increase switching frequency, and have been widely applied to various electronic devices. A soft switch circuit used in an isolated switching power supply is different from that used in a non-isolated switching power supply. Therefore, a soft switch circuit applicable to both the isolated switching power supply and the non-isolated switching power supply is one of research directions in the related art.

SUMMARY

The embodiments of the present disclosure provide a soft switch circuit and a control method thereof, and a power source assembly including the soft switch circuit.

In a first aspect of the present disclosure, there is provided a soft switch circuit, including a switching voltage terminal, a main inductor, and a second voltage terminal, the switching voltage terminal being electrically connected to a first terminal of the main inductor, and the second voltage terminal being electrically connected to a second terminal of the main inductor, and the soft switch circuit further includes an auxiliary module and a first voltage terminal, and the auxiliary module is connected in series between the switching voltage terminal and the first voltage terminal, the auxiliary module is configured to be charged with a first voltage input from the first voltage terminal when the switching voltage terminal receives a first level signal, so as to reduce a current flowing through the switching voltage terminal: and the auxiliary module is further configured to discharge to the switching voltage terminal when the switching voltage terminal receives a second level signal, wherein the first level signal and the second level signal are different from each other.

In a second aspect of the present disclosure, there is provided a power source assembly, including a main circuit and a soft switch circuit. The soft switch circuit is the soft switch circuit provided in the first aspect of the present disclosure. The main circuit includes a power source module, a total output capacitor, and a power output terminal, an output terminal of one of the power source module and a first electrode of the total output capacitor is electrically connected to the switching voltage terminal, an output terminal of the other of the power source module and the first electrode of the total output capacitor is electrically connected to the second voltage terminal, a positive electrode of the power output terminal is electrically connected to the first electrode of the total output capacitor, and a negative electrode of the power output terminal is electrically connected to a second electrode of the total output capacitor.

In a third aspect of the present disclosure, there is provided a control method for a soft switch circuit, wherein the soft switch circuit is the soft switch circuit provided in the first aspect of the present disclosure, and the control method includes: when the switching voltage terminal receives the first level signal, controlling the auxiliary module to be charged with the first voltage input from the first voltage terminal, so as to reduce the current flowing through the switching voltage terminal: when the switching voltage terminal receives the second level signal, controlling the auxiliary module to discharge to the switching voltage terminal.

DETAIL DESCRIPTION OF EMBODIMENTS

In order to enable those of ordinary skill in the art to better understand the technical solutions of the present disclosure, a soft switch circuit and a control method therefor, and a power source assembly including the soft switch circuit provided by the present disclosure are described in detail below with reference to the accompanying drawings.

Exemplary implementations will be described more fully below with reference to the accompanying drawings, but the exemplary implementations illustrated may be implemented in different forms, and should not be interpreted as being limited to the implementations described below. Rather, the implementations are provided to make the present disclosure thorough and complete, and are intended to enable those of ordinary skill in the art to fully understand the scope of the present disclosure.

All the implementations of the present disclosure and the features therein may be combined with each other if no conflict is incurred.

The term "and/or" used herein includes any and all combinations of one or more associated listed items.

The terms used herein are merely used to describe particular implementations, and are not intended to limit the present disclosure. The terms "a" and "the" used herein which indicate a singular form are intended to include a plural form, unless expressly stated in the context. It should be further understood that the terms "include" and/or "be made of" used herein indicate the presence of the described features, integers, steps, operations, elements and/or components, but do not exclude the presence or addition of one or more other features, integers, steps, operations, elements, components and/or combinations thereof.

Unless otherwise defined, all the terms (including technical and scientific terms) used herein have the same meaning as commonly understood by those of ordinary skill in the art. It should be further understood that terms, such as those defined in commonly used dictionaries, should be interpreted as having a meaning that is consistent with a meaning in the context of the related technology and the background of the present disclosure, and should not be interpreted in an idealized or overly formal sense unless expressly so defined herein.

Figure 1:
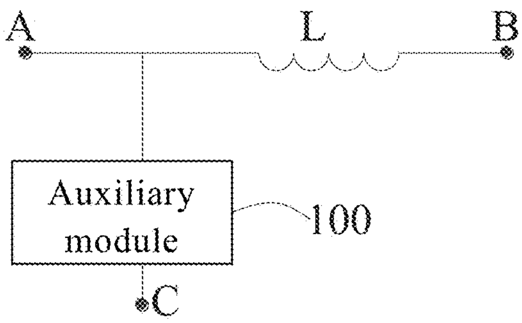
FIG. 1 is a schematic diagram illustrating a first implementation of a soft switch circuit according to the present disclosure.

In a first aspect of the present disclosure, there is provided a soft switch circuit. As shown in FIG. 1, a soft switch circuit includes a switching voltage terminal A, a main inductor L, and a second voltage terminal B, the switching voltage terminal A is electrically connected to a first terminal of the main inductor L, and the second voltage terminal B is electrically connected to a second terminal of the main inductor L. The soft switch circuit further includes an auxiliary module 100 and a first voltage terminal C, and the auxiliary module 100 is connected in series between the switching voltage terminal A and the first voltage terminal C.

The auxiliary module 100 is configured to be charged with a first voltage input from the first voltage terminal C when the switching voltage terminal A receives a first level signal, so as to reduce a current flowing through the switching voltage terminal A.

The auxiliary module 100 is further configured to discharge to the switching voltage terminal A when the switching voltage terminal A receives a second level signal. It should be noted that discharging to the switching voltage terminal A can increase the current in the switching voltage terminal A.

The first level signal and the second level signal are different from each other. That is, one of the first level signal and the second level signal is a high level signal, and the other is a low level signal.

When the switching voltage terminal A receives the first level signal, the switching voltage terminal may charge the auxiliary module, thereby reducing the current in the switching voltage terminal: and when the switching voltage terminal A receives the second level signal, the auxiliary module discharges to the switching voltage terminal. That is, by changing the level signal supplied to the switching voltage terminal A, regulation of the switching voltage terminal A can be realized and a "soft switching" function can be performed.

In the present disclosure, the auxiliary module 100 has a charging or discharging function. Therefore, the auxiliary module 100 may be configured to regulate a current flowing through the main inductor L and realize current regulation for the switching voltage terminal A. When the soft switch circuit is applied to a switching power supply, no matter a power circuit connected to the switching power supply is an isolated circuit or a non-isolated circuit, the current in the switching voltage terminal can cross zero, and "soft" switching of the power circuit can be finally realized. That is, the soft switch circuit provided by the present disclosure is applicable to both the isolated switching power supply and the non-isolated switching power supply.

A specific structure of the auxiliary module 100 is not particularly limited in the present disclosure as long as the auxiliary module 100 is capable of charging or discharging according to the level signal received by the switching voltage terminal A to assist the main inductor L in regulating the current in the switching voltage terminal A.

Figure 2:
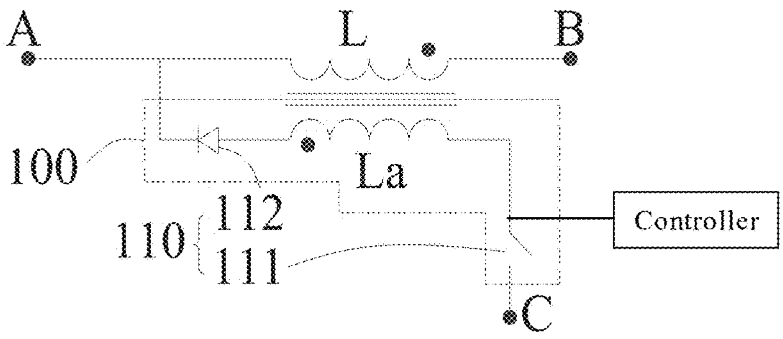
FIG. 2 is a schematic diagram illustrating a second implementation of a soft switch circuit according to the present disclosure.

In an alternative implementation, as shown in FIG. 2, the auxiliary module 100 includes an auxiliary inductor La and a control unit 110 which are connected in series.

The control unit 110 is configured to control two terminals of the auxiliary inductor La to be respectively connected to the first voltage terminal C and the switching voltage terminal when the switching voltage terminal A receives the first level signal, so as to realize charging of the auxiliary inductor La. Charging the auxiliary inductor La is the aforesaid "charging the auxiliary module", and can reduce the current flowing through the switching voltage terminal A.

The control unit 110 is further configured to control, when the auxiliary inductor discharges under the condition that the switching voltage terminal receives the second level signal, the auxiliary inductor La to be disconnected from the first voltage terminal C, and control the switching voltage terminal A to be connected to the auxiliary inductor La, so as to control the auxiliary inductor La to discharge to the switching voltage terminal.

The control unit 110 may control connection and disconnection between the auxiliary inductor La and the switching voltage terminal A/the first voltage terminal C, so as to control charging or discharging of the auxiliary inductor La.

A timing of disconnecting the auxiliary inductor La from the first voltage terminal C is not particularly limited in the present disclosure. Optionally, the auxiliary module 100 is further configured to enable the auxiliary inductor La to discharge when the switching voltage terminal A receives the second level signal, and the control unit 110 controls the auxiliary inductor La to be disconnected from the first voltage terminal when a current in the auxiliary inductor La crosses zero during discharging.

In an alternative implementation, the auxiliary inductor La is capable of generating magnetic coupling with the main inductor L.

When the switching voltage terminal A receives the first level signal, the two terminals of the auxiliary inductor La are respectively connected to the first voltage terminal C and the switching voltage terminal A. The auxiliary inductor La may be charged through superposition of the first voltage supplied from the first voltage terminal C and a coupling voltage generated with the main inductor L, so as to reduce the current flowing through the switching voltage terminal A. When a current flowing through the auxiliary inductor La is larger than that flowing through the main inductor L, the current in the switching voltage terminal A crosses zero, thereby realizing “soft” switching.

When the switching voltage terminal A receives the second level signal, the auxiliary inductor La is disconnected from the first voltage terminal C, and the switching voltage terminal A is connected to the auxiliary inductor La while the second level signal is maintained. At this time, a voltage across the two terminals of the main inductor L is reversed, and the auxiliary inductor La discharges to the switching voltage terminal under the action of superposition of a second level supplied from the second voltage terminal B and the coupling voltage of the main inductor L. The auxiliary inductor La continuously discharges to the second voltage terminal B until the current in the auxiliary inductor becomes zero, thereby realizing zero current turn-off.

A specific form of the auxiliary inductor La is not particularly limited as long as the auxiliary inductor La can generate magnetic coupling with the main inductor L and achieve charging or discharging. In an alternative implementation, in order to achieve magnetic coupling, the auxiliary inductor La is wound around a core of the main inductor L.

In the implementation illustrated by FIG. 2, there is leakage inductance between the auxiliary inductor La and the main inductor.

A specific structure of the control unit 110 is not particularly limited in the present disclosure as long as the control unit 110 can control the connection and disconnection between the auxiliary inductor La and the first voltage terminal C and the connection and disconnection between the auxiliary inductor La and the switching voltage terminal A as required.

In an alternative implementation, the control unit 110 includes a controller and an auxiliary switch element 111 which is connected in series with the auxiliary inductor La.

The controller is configured to generate and output a first control signal when the switching voltage terminal A receives the first level signal, and is further configured to generate and output a second control signal when the switching voltage terminal A receives the second level signal.

A control terminal of the auxiliary switch element 111 is electrically connected to an output terminal of the controller. The auxiliary switch element 111 is configured to be turned on when the control terminal of the auxiliary switch element 111 receives the first control signal, and is further configured to be turned off when the control terminal of the auxiliary switch element 111 receives the second control signal.

By providing the auxiliary switch element 111 and the controller for controlling the auxiliary switch element 111, the connection and disconnection between the auxiliary inductor La and the first voltage terminal C and the connection and disconnection between the auxiliary inductor La and the switching voltage terminal A can be controlled as required.

In order to further simplify an operation procedure executed in the controller, optionally, the control unit 110 may further include a unidirectional conduction element 112 connected in series with the auxiliary switch element 111. The unidirectional conduction element 112 enables the auxiliary inductor La to perform unidirectional discharging, and the controller generates, under the condition that the current in the auxiliary inductor La discharges to zero, the second control signal to control the auxiliary switch element 111 to be turned off.

By providing the unidirectional conduction element 112, the controller can determine a timing of generating the second control signal.

How to arrange the unidirectional conduction element 112 and the auxiliary switch element 111 is not particularly limited in the present disclosure. In an alternative implementation, the auxiliary switch element 111 and the unidirectional conduction element 112 are respectively connected in series with the two terminals of the auxiliary inductor La.

In the above implementation, the unidirectional conduction element 112 is configured to allow a current to flow from the auxiliary inductor La to the switching voltage terminal A when the auxiliary switch element 111 is turned off.

A specific structure of the auxiliary switch element 111 is not particularly limited in the present disclosure. For example, the auxiliary switch element 111 may be a metal oxide semiconductor (MOS) transistor, and a gate electrode of the MOS transistor is the control terminal of the auxiliary switch element 111.

A specific structure of the unidirectional conduction element 112 is not particularly limited in the present disclosure either. Optionally, the unidirectional conduction element 112 may be a diode, so that the unidirectional conduction element may realize conduction or cut off according to potentials at two terminals of the unidirectional conduction element, thereby reducing a loss of the soft switch circuit.

Specific positions of the auxiliary switch element 111 and the unidirectional conduction element 112 are not particularly limited in the present disclosure. Optionally, the auxiliary switch element 111 may be connected in series between the auxiliary inductor La and the first voltage terminal C, and the unidirectional conduction element 112 may be connected in series between the auxiliary inductor La and the switching voltage terminal A.

In the present disclosure, when the auxiliary module 100 discharges to the switching voltage terminal A in the case where the switching voltage terminal A receives the second level signal, when the auxiliary module 100 stops discharging is not particularly limited. For example, the auxiliary module 100 may discharge to the switching voltage terminal A until the current in the auxiliary module 100 crosses zero.

Figure 3:
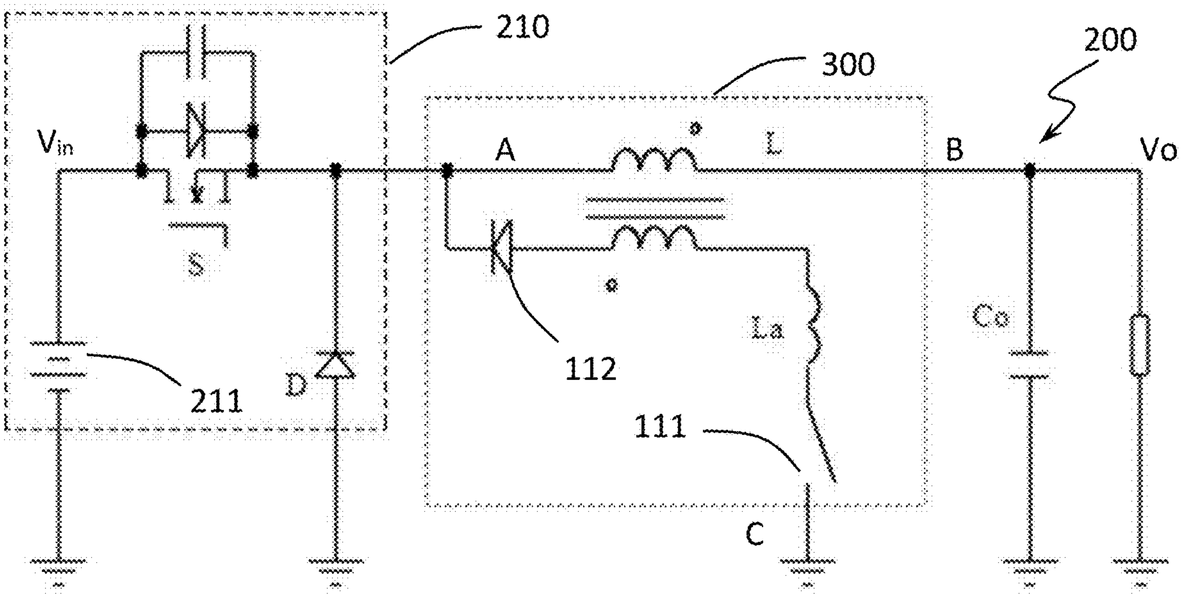
FIG. 3 is a schematic diagram illustrating a first implementation of a power source assembly according to the present disclosure.

In a second aspect of the present disclosure, there is provided a power source assembly. As shown in FIG. 3, the power source assembly includes a main circuit 200 and a soft switch circuit 300, with the soft switch circuit 300 being the soft switch circuit provided in the first aspect of the present disclosure. The main circuit 200 includes a power source module 210, a total output capacitor Co and a power output terminal, an output terminal of one of the power source module 210 and a first electrode of the total output capacitor Co is electrically connected to the switching voltage terminal A, an output terminal of the other of the power source module 210 and the first electrode of the total output capacitor Co is electrically connected to the second voltage terminal B, a positive electrode of the power output terminal is electrically connected to the first electrode of the total output capacitor Co, and a negative electrode of the power output terminal is electrically connected to a ground terminal of the total output capacitor Co.

As stated above, the soft switch circuit can be applied to both the isolated power supply and the non-isolated power supply. Therefore, in the power source assembly provided by the present disclosure, the power source module of the main circuit may be an isolated power supply or a non-isolated power supply.

In addition, the main circuit may be a voltage boosting circuit or a voltage reducing circuit. Which one of the power source module and the first electrode of the total output capacitor is electrically connected to the switching voltage terminal is determined according to a specific type of the main circuit.

A specific structure of the power source module 210 is not particularly limited in the present disclosure. Optionally, the power source module 210 includes a direct-current power source unit 211, and a positive electrode of the direct-current power source unit 21 is capable of powering the output terminal of the power source module 210.

Figure 5:
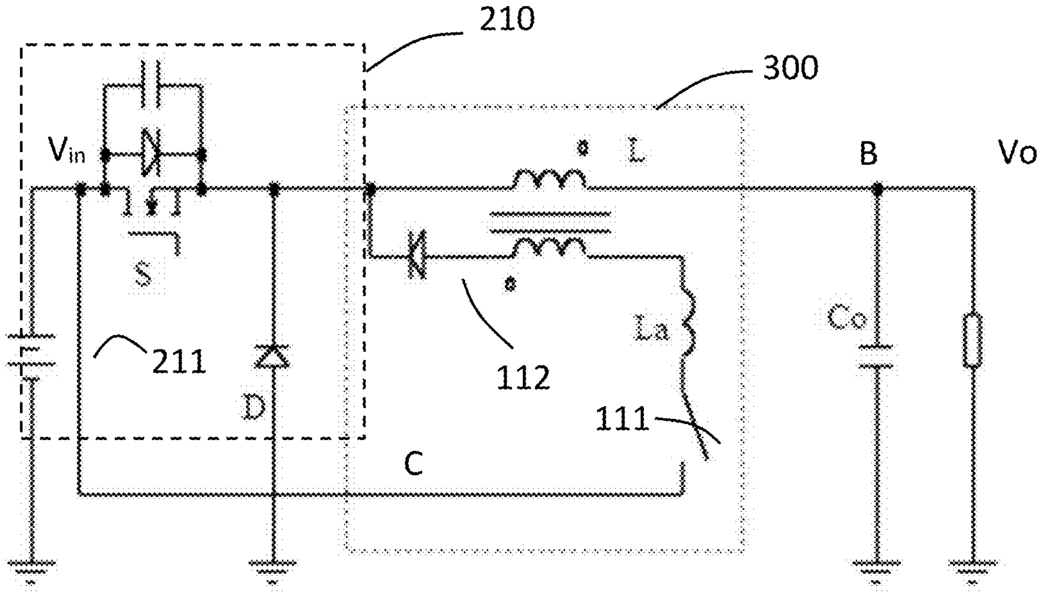
FIG. 5 is a schematic diagram illustrating a second implementation of a power source assembly according to the present disclosure.

In alternative implementations, as shown in FIGS. 3 and 5, the power source module includes the direct-current power source unit 211, a switch unit S, and a freewheel diode D.

The positive electrode of the direct-current power source unit 211 is electrically connected to a first terminal of the switch unit S, and a negative electrode of the direct-current power source unit 211 is electrically connected to a reference voltage terminal.

A second terminal of the switch unit S is electrically connected to the switching voltage terminal A, an anode of the freewheel diode D is electrically connected to the reference voltage terminal, and a cathode of the freewheel diode D is electrically connected to the switching voltage terminal A.

The first electrode of the total output capacitor Co is electrically connected to the second voltage terminal B, a second electrode of the total output capacitor Co is grounded, and the second voltage terminal B is electrically connected to one of the reference voltage terminal and the positive electrode of the direct-current power source unit.

Figure 6:
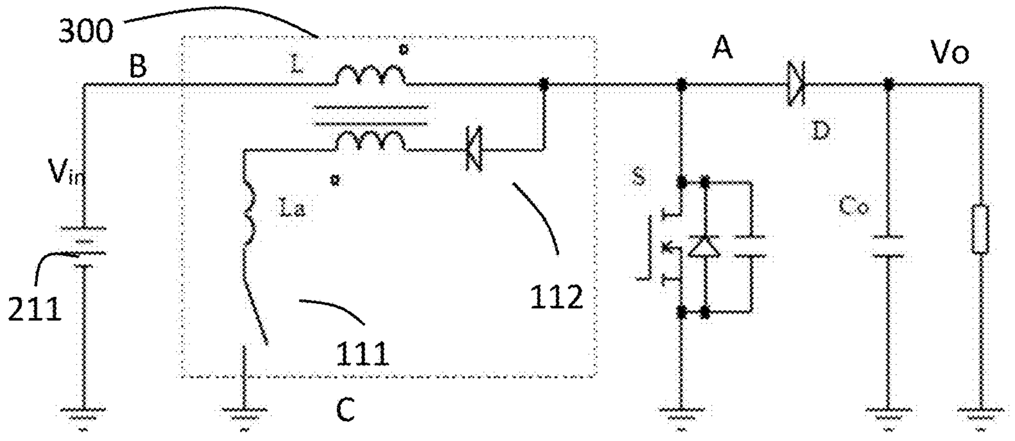
FIG. 6 is a schematic diagram illustrating a third implementation of a power source assembly according to the present disclosure.

In an alternative implementation, as shown in FIG. 6, the power source module includes the direct-current power source unit 211, a switch unit S, and a freewheel diode D.

The positive electrode of the direct-current power source unit 211 is electrically connected to the second voltage terminal B, and a negative electrode of the direct-current power source unit 211 is electrically connected to a reference voltage terminal.

One terminal of the switch unit S is electrically connected to the switching voltage terminal A, and the other terminal of the switch unit S is electrically connected to the reference voltage terminal.

An anode of the freewheel diode D is electrically connected to one terminal of the switch unit S, a cathode of the freewheel diode D is electrically connected to the first electrode of the total output capacitor Co, and a second electrode of the total output capacitor Co is electrically connected to the reference voltage terminal.

The first voltage terminal C is electrically connected to the reference voltage terminal.

Figure 8:
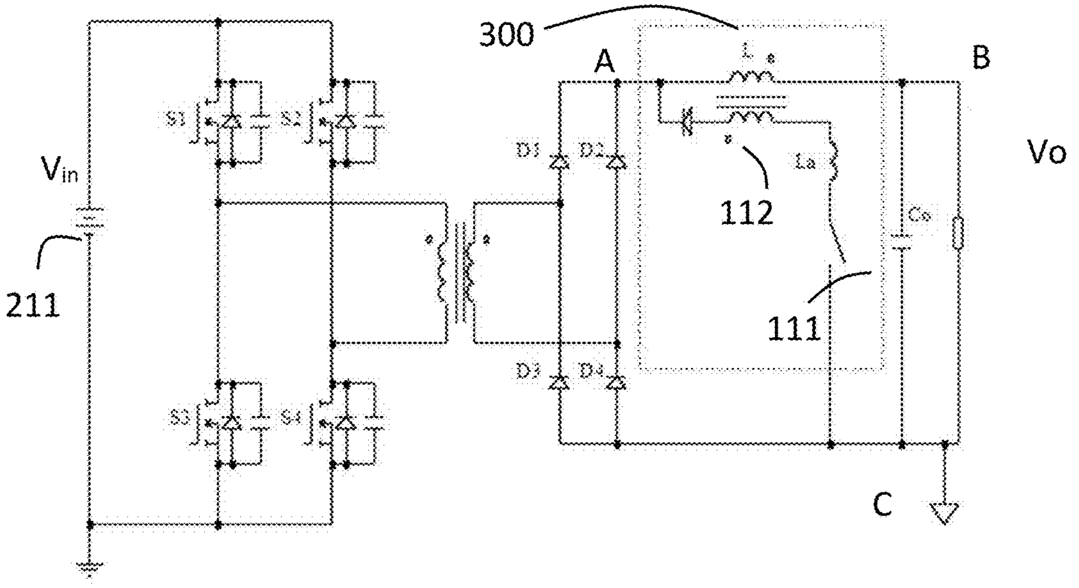
FIG. 8 is a schematic diagram illustrating a fourth implementation of a power source assembly according to the present disclosure.

In an alternative implementation, as shown in FIG. 8, the power source module includes the direct-current power source unit 211, an inverter unit, a transformer unit, and a rectification unit, two input terminals of the inverter unit are electrically connected to the positive electrode of the direct-current power source unit 211 and a negative electrode of the direct-current power source unit 211 respectively, an input terminal of the transformer unit is electrically connected to an output terminal of the inverter unit, an output terminal of the transformer unit is electrically connected to an input terminal of the rectification unit, and an output terminal of the rectification unit is electrically connected to the switching voltage terminal.

Figure 11:
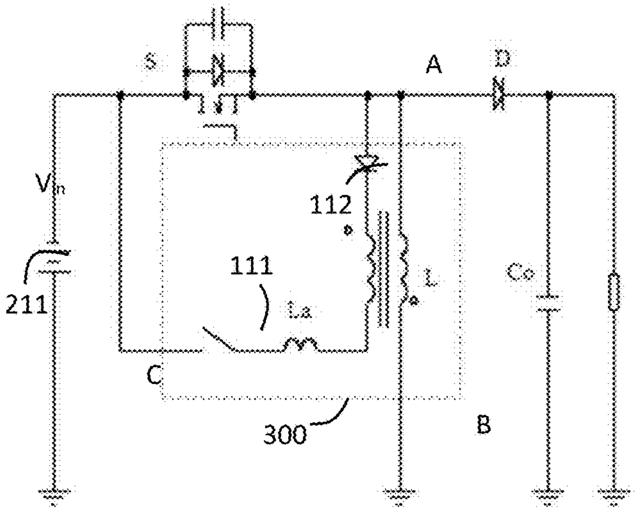
FIG. 11 is a schematic diagram illustrating a fifth implementation of a power source assembly according to the present disclosure.
Figure 12:
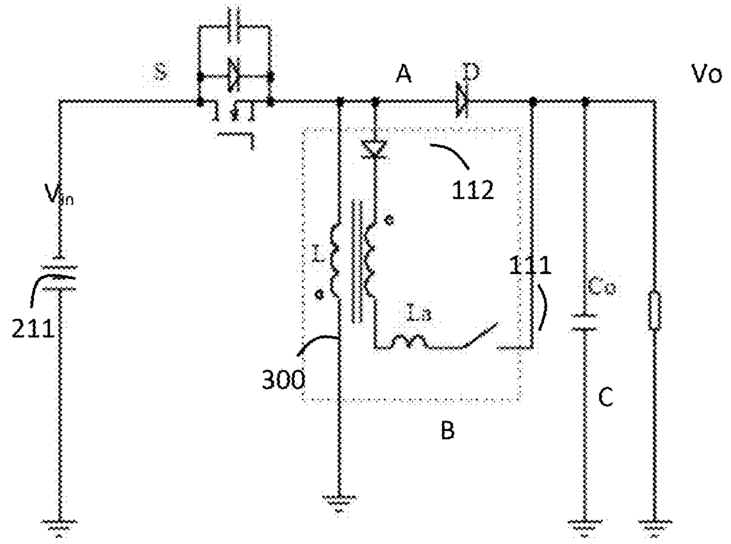
FIG. 12 is a schematic diagram illustrating a sixth implementation of a power source assembly according to the present disclosure.

In alternative implementations, as shown in FIGS. 11 and 12, the power source module includes the direct-current power source unit 211, a switch unit S, and a freewheel diode D.

The positive electrode of the direct-current power source unit 211 is electrically connected to a reference voltage terminal, a negative electrode of the direct-current power source unit 211 is electrically connected to one terminal of the switch unit S, and the other terminal of the switch unit S is electrically connected to the switching voltage terminal A.

An anode of the freewheel diode D is electrically connected to the switching voltage terminal A, and a cathode of the freewheel diode D is electrically connected to the first electrode of the total output capacitor Co.

The first voltage terminal C is electrically connected to one of the reference voltage terminal and a cathode of the direct-current power source unit 211, and the second voltage terminal B is electrically connected to the reference voltage terminal. Specifically, in the implementation illustrated by FIG. 11, the first voltage terminal C is electrically connected to the cathode of the direct-current power source unit 211; and in the implementation illustrated by FIG. 12, the first voltage terminal C is electrically connected to the reference voltage terminal.

Figure 13:
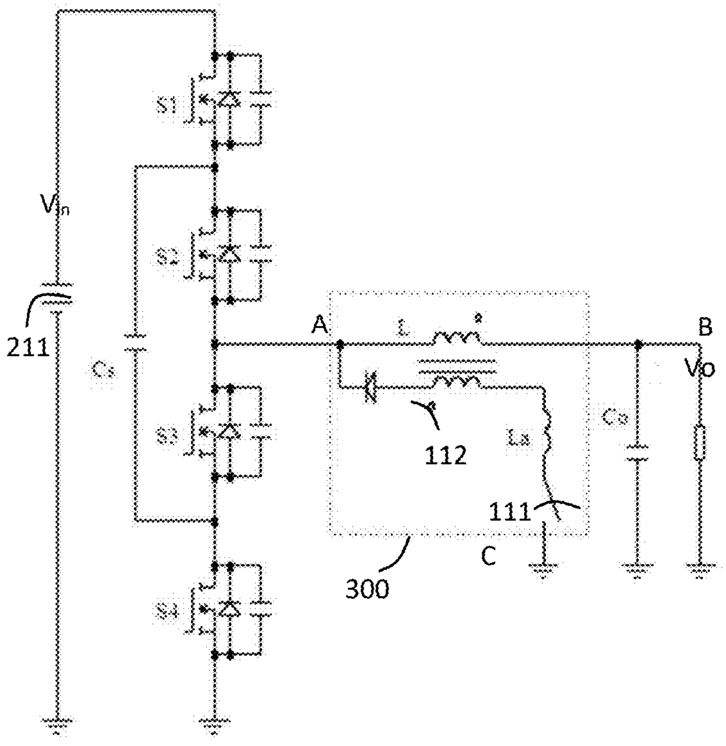
FIG. 13 is a schematic diagram illustrating a seventh implementation of a power source assembly according to the present disclosure.

In an alternative implementation, as shown in FIG. 13, the power source module includes the direct-current power source unit 211, a switched capacitor Cs, and a plurality of serially connected switch elements (i.e., a switch element S1, a switch element S2, a switch element S3, and a switch element S4 show in FIG. 13). A first electrode of the switched capacitor Cs is electrically connected to an electrical connection node between the first switch element S1 and the second switch element S2 among the plurality of serially connected switch elements, and a second electrode of the switched capacitor Cs is electrically connected to an electrical connection node between the last switch element (i.e., the switch element S4 in FIG. 13) and the second to last switch element (i.e., the switch element S3 in FIG. 13) among the plurality of serially connected switch elements.

The switching voltage terminal A is electrically connected to an electrical connection node between two switch elements (i.e., the switch element S2 and the switch element S3 in FIG. 13) located at middle positions among the plurality of serially connected switch elements, the second voltage terminal B is electrically connected to the first electrode of the total output capacitor Co, and the first voltage terminal is electrically connected to a reference voltage terminal.

The positive electrode of the direct-current power source unit 211 is electrically connected to one terminal of the first switch element (i.e., the switch element S1 in FIG. 13) among the plurality of serially connected switch elements, and a cathode of the direct-current power source unit 211 is electrically connected to the reference voltage terminal.

Figure 14:
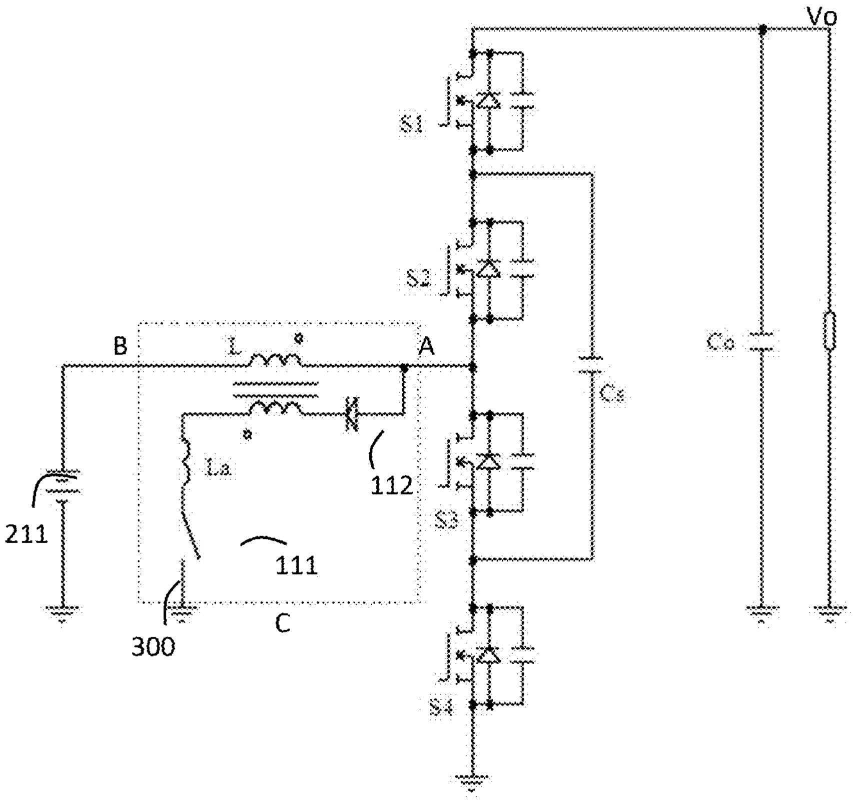
FIG. 14 is a schematic diagram illustrating an eighth implementation of a power source assembly according to the present disclosure.

In an alternative implementation, as shown in FIG. 14, the power source module includes the direct-current power source unit 211, a switched capacitor Cs, and a plurality of serially connected switch elements (i.e., a switch element S1, a switch element S2, a switch element S3, and a switch element S4 show in FIG. 14). A first electrode of the switched capacitor Cs is electrically connected to an electrical connection node between the first switch element (i.e., the switch element S1 in FIG. 14) and the second switch element (i.e., the switch element S2 in FIG. 14) among the plurality of serially connected switch elements, and a second electrode of the switched capacitor Cs is electrically connected to an electrical connection node between the last switch element (i.e., the switch element S4 in FIG. 14) and the second to last switch element (i.e., the switch element S3 in FIG. 14) among the plurality of serially connected switch elements.

The switching voltage terminal A is electrically connected to an electrical connection node between two switch elements (i.e., the switch element S2 and the switch element S3 in FIG. 14) located at middle positions among the plurality of serially connected switch elements, the second voltage terminal B is electrically connected to the positive electrode of the direct-current power source unit 211, and the first voltage terminal C is electrically connected to a reference voltage terminal.

A negative electrode of the direct-current power source unit 211 is electrically connected to the reference voltage terminal.

Figure 15:
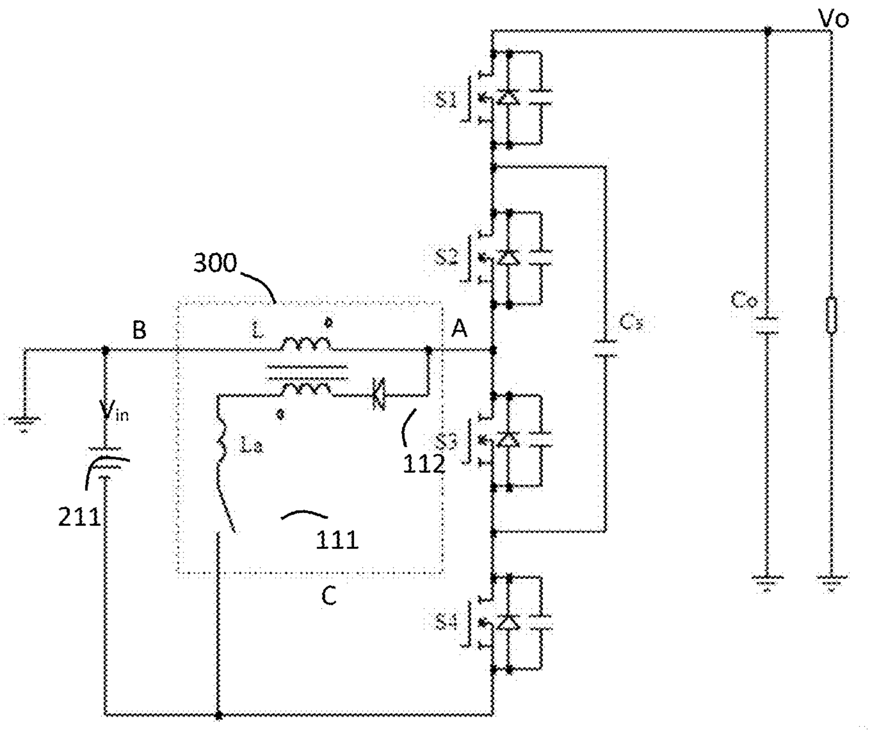
FIG. 15 is a schematic diagram illustrating a ninth implementation of a power source assembly according to the present disclosure.

In an alternative implementation, as shown in FIG. 15, the power source module includes the direct-current power source unit 211, a switched capacitor Cs, and a plurality of serially connected switch elements (i.e., a switch element S1, a switch element S2, a switch element S3, and a switch element S4 show in FIG. 15). A first electrode of the switched capacitor Cs is electrically connected to an electrical connection node between the first switch element (i.e., the switch element S1 in FIG. 15) and the second switch element (i.e., the switch element S2 in FIG. 15) among the plurality of serially connected switch elements, and a second electrode of the switched capacitor Cs is electrically connected to an electrical connection node between the last switch element (i.e., the switch element S4 in FIG. 15) and the second to last switch element (i.e., the switch element S3 in FIG. 15) among the plurality of serially connected switch elements.

The switching voltage terminal is electrically connected to an electrical connection node between two switch elements (i.e., the switch element S2 and the switch element S3 in FIG. 15) located at middle positions among the plurality of serially connected switch elements, the second voltage terminal is electrically connected to the positive electrode of the direct-current power source unit, and the first voltage terminal is electrically connected to a negative electrode of the direct-current power source unit.

The positive electrode of the direct-current power source unit 211 is electrically connected to a reference voltage terminal.

For different types of the main circuit, operation processes and operation principles of the soft switch circuit are described below in conjunction with FIGS. 3 to 15.

FIG. 3 illustrates the first implementation of the power source assembly provided by the present disclosure, and a non-isolated buck power supply is adopted in this implementation. In the implementation illustrated by FIG. 3, the main circuit further includes a freewheel diode D, the power source module 210 includes the direct-current power source unit 211 and the switch unit S, the anode of the freewheel diode D is grounded, and the cathode of the freewheel diode D is electrically connected to the switching voltage terminal A. The switch unit S, the freewheel diode D, the main inductor L, and the total output capacitor Co form a typical Buck-type voltage reducing circuit. By controlling on and off of the switch unit S, an input voltage Vin supplied by the direct-current power source unit 211 may be converted into a switching voltage with a level of 0) (i.e., the second level signal) or a switching voltage with a level of Vin (i.e., the first level signal), and the switching voltage is subjected to low-frequency filtering by the main inductor L and the total output capacitor Co to obtain an output voltage Vo, thus realizing buck-type voltage conversion with Vo being lower than Vin.

In FIG. 3, a node at which the switch unit S and the freewheel diode D are connected is the switching voltage terminal A, and a level at the switching voltage terminal A is switched between two levels, namely Vin (when the switch unit S is turned on) and 0 (when the switch unit S is turned off). The first electrode of the total output capacitor Co is electrically connected to the second voltage terminal B of the soft switch circuit. In the present implementation, a reference voltage for the input voltage and the output voltage is the voltage input to the first voltage terminal C of the soft switch circuit.

Since the freewheel diode D has a forward conduction voltage drop, the freewheel diode D may be replaced with a synchronous rectifier to reduce a loss in practical applications. That is, the soft switch circuit provided by the present disclosure is applicable to scenarios where a diode and a synchronous rectifier are employed used for keeping a current uninterrupted.

In the case where the freewheel diode D is used for keeping a continuous current, the soft switch circuit provided by the present disclosure can realize zero current turn-off of the diode and reduce a reverse recovery loss, and the switch unit S can realize near-zero voltage turn-on.

In the case where the synchronous rectifier is used for keeping a continuous current, the soft switch circuit provided by the present disclosure can realize zero reverse recovery of a body diode of the synchronous rectifier, and the switch unit S can also realize zero voltage turn-on.

All the freewheel diodes as stated in the present disclosure can be replaced with synchronous rectifiers.

In the description of the control of the soft switch circuit control and implemented waveforms, adopting the synchronous rectifier as the switch unit S is taken as an example. The switch unit S in the present disclosure includes, but is not limited to, a metal oxide semiconductor field effect transistor (MOSFET). Preferably, the switch unit S is an MOSFET. Adopting the MOSFET as the switch unit S is taken as an example in the following description. It should be understood that a parasitic body diode and a parasitic output capacitor exist in an MOSFET device, the existence of the parasitic body diode is one of the characteristics that allow the MOSFET device to be used as the synchronous rectifier to replace the freewheel diode, the parasitic output capacitor may cause a switching loss when the switch unit S is turned on or off, and controlling the switch unit S to be turned on after the parasitic output capacitor discharges is one of important means and purposes for implementing the soft switch circuit, thereby reducing the switching loss.

Figure 4:
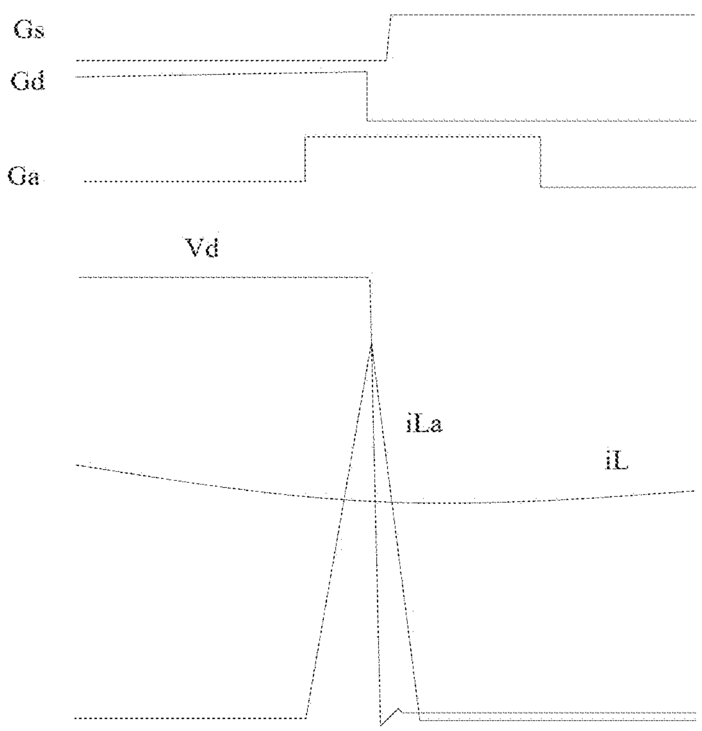
FIG. 4 is a schematic diagram illustrating timing diagrams of all signals, a current flowing through a main inductor, and a current flowing through an auxiliary inductor in the power source assembly shown in FIG. 3.

FIG. 4 is a waveform diagram of signals for controlling the soft switch circuit shown in FIG. 3. In FIG. 4, Gs is a waveform of a control signal for the switch unit S, and the switch unit S is turned on when the control signal is at a high level and is turned off when the control signal is at a low level. Gd is a waveform of a control signal when the freewheel diode D shown in FIG. 3 is replaced with the synchronous rectifier, and Ga is a waveform of a control signal for the auxiliary switch element 111. Vd is a voltage across two terminals of the switch unit S, iL is a waveform of the current in the main inductor L, and iLa is a waveform of the current in the auxiliary inductor La.

Before the auxiliary switch element 111 is turned on, the freewheel diode D is turned on, the level at the switching voltage terminal is 0 (equal to the reference voltage), the voltage $V_L$ across the two terminals of the main inductor L is equal to −Vo, and the current flowing through the main inductor L does not change greatly at an on moment or an off moment because the inductance of the main inductor L is large.

When the auxiliary switch element 111 is turned on, the voltage $V_{La}$ across the two terminals of the auxiliary inductor La is calculated by the following formula:

$$V_{La} = 0 - V_L \times N = V_o \times N$$

where $V_L$ is the voltage across the two terminals of the main inductor; and

N is a ratio of the number of turns of the auxiliary inductor coupled to the main inductor to the number of turns of the main inductor.

When the auxiliary switch element 111 is turned on, charging of the auxiliary inductor La begins, a current flowing through the freewheel diode D is equal to a result of subtracting the current iLa flowing through the auxiliary inductor La from the current iL flowing through the main inductor L, and the current flowing through the freewheel diode D begins to decrease. Since the inductance of the auxiliary inductor La is small, a charging speed of the auxiliary inductor La is fast. When iLa is greater than iL, the current flowing through the freewheel diode D is 0, so that the reverse recovery loss of the freewheel diode D can be greatly reduced.

When the auxiliary switch element 1111 is implemented by the synchronous rectifier, a reverse current begins to flow through the synchronous rectifier. Then, the control signal Gd for the synchronous rectifier is switched off, the reverse current discharges to a parasitic output capacitor of the auxiliary switch element 111 until the reverse current discharges to 0, and then the parasitic body diode of the switch unit S maintains the current, at this time, the voltage Vd across the two terminals of the switch unit S is equal to 0, and zero-voltage turn-on of the switch unit S can be realized by controlling Gs to be at a high level.

After the switch unit S is turned on, the level at the switching voltage terminal is Vin, and the voltage $V_L$ across the two terminals of the main inductor L satisfies $V_L$=Vin−Vo. At this time, the voltage $V_{La}$ across the two terminals of the auxiliary inductor La is:

$$V_{La} = 0 - (V_{in} + V_L \times N) = -(V_{in} + N(V_{in} - V_o))$$

For a buck circuit, $V_{in}$ is greater than $V_o$. Therefore, the auxiliary inductor La begins to discharge. When the current flowing through the auxiliary inductor La decreases to zero, the unidirectional conduction element 112 cuts off, the current in the auxiliary inductor La is stopped, and the auxiliary switch element 111 can realize zero current turn-off, that is, the auxiliary switch element 111 has no turn-off loss.

As can be seen from the waveforms shown in FIG. 4, the soft switch circuit according to the present disclosure can keep a continuous current in the main power inductor L, with a small ripple, so that the magnitude of an effective value of the current and the magnitude of a peak value of the current are not affected, and a conduction loss and a turn-off loss of the switching circuit are not affected. Meanwhile, the current in the auxiliary inductor of the soft switch circuit merely acts for a short time at an on moment or an off moment, so that an extra conduction loss of the soft switch circuit is very small. Moreover, the current in the auxiliary inductor can automatically discharge to zero, so that zero current turn-off can be realized, and no extra turn-off loss is caused.

FIG. 5 is a circuit diagram illustrating the second implementation of the power source assembly provided by the present disclosure, and the power source assembly in FIG. 5 differs from the power source assembly in FIG. 3 in that the first voltage terminal C of the soft switch circuit 300 is electrically connected to the positive electrode of the direct-current power source unit 211.

In the power source assembly shown in FIG. 5, when the level at the switching voltage terminal A is 0 (equal to the reference voltage), the auxiliary switch element 111 is turned on, and an obtained charging voltage of the auxiliary inductor La is as follows:

$$V_{La} = V_{in} - V_L \times N = V_{in} - V_o \times N.$$

When the level at the switching voltage terminal A is $V_{in}$, a discharging voltage of the auxiliary inductor La is as follows:

$$V_{La} = V_{in} - (V_{in} + V_L \times N) = -N(V_{in} - V_o).$$

The power source assembly disclosed by FIG. 5 is often used in common buck-type applications with a small duty ratio and a large change between an input voltage and an output voltage, the charging voltage and the discharging voltage of the auxiliary inductor La are well balanced, and a better soft switching effect can be produced.

FIG. 6 is a circuit diagram illustrating the third implementation of the power source assembly provided by the present disclosure. The power source assembly in FIG. 6 is a non-isolated boost power source assembly. In FIG. 6, the switch unit S, the freewheel diode D, the main inductor L, and the total output capacitor Co form a typical Boost-type voltage reducing circuit. The main inductor L is charged and discharged by controlling on and off of the switch unit S, so as to realize boost-type voltage conversion with the output voltage $V_o$ being higher than the input voltage $V_{in}$.

In the present implementation, a node at which the switch unit S is electrically connected to the anode of the freewheel diode D is electrically connected to the switching voltage terminal A of the soft switch circuit 300, and the voltage of the switching voltage terminal A is switched between two levels, namely 0 (when the switch unit S is turned on) and $V_o$ (when the switch unit S is turned off). The positive electrode of the direct-current power source unit 211 is electrically connected to the second voltage terminal B of the soft switch circuit 300, and the first voltage terminal C is electrically connected to the reference voltage terminal.

Figure 7:
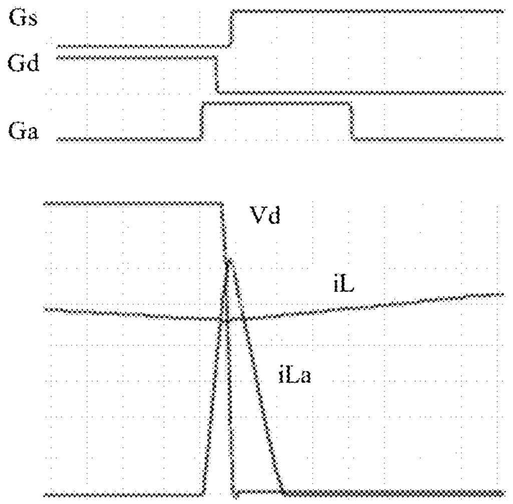
FIG. 7 is a schematic diagram illustrating timing diagrams of all signals, a current flowing through a main inductor, and a current flowing through an auxiliary inductor in the power source assemblies shown in FIGS. 5 and 6.

FIG. 7 is a timing diagram and a current diagram of control signals for the soft switch circuit in the power source assembly provided in the implementation illustrated by FIG. 6. In FIG. 7, Gs is a waveform of a control signal for the switch unit S, and the switch unit S is turned on when the control signal is at a high level and is turned off when the control signal is at a low level. Gd is a waveform of a control signal when the freewheel diode D shown is replaced with the synchronous rectifier, and Ga is a waveform of a control signal for the auxiliary switch element 111. Vd is a voltage across two terminals of the switch unit S, iL is a waveform of the current in the main inductor L, and iLa is a waveform of the current in the auxiliary inductor La.

Before the auxiliary switch element 111 is turned on, the freewheel diode D is turned on, the level at the switching voltage terminal is the output voltage $V_o$, the voltage $V_L$ across the two terminals of the main inductor L is equal to $V_{in}-V_o$, and the current flowing through the main inductor L does not change greatly at an on moment or an off moment because the inductance of the main inductor L is large.

When the auxiliary switch element 111 is turned on, the voltage $V_{La}$ across the two terminals of the auxiliary inductor La is calculated by the following formula:

$$V_{La} = Vo + V_L \times N = V_o + (V_o - V_{in}) \times N.$$

Charging of the auxiliary inductor La begins. When the current iLa flowing through the auxiliary inductor La is greater than the current iL flowing through the main inductor L, the current flowing through the freewheel diode D is 0, so that the reverse recovery loss of the freewheel diode D can be greatly reduced. When the freewheel diode D is replaced with the synchronous rectifier, a reverse current begins to flow through the synchronous rectifier used as the freewheel diode D. Then, the control signal Gd for the synchronous rectifier used as the freewheel diode D is switched off, the reverse current discharges to the parasitic output capacitor of the switch unit S until the reverse current discharges to 0, and then the parasitic body diode of the switch unit S maintains the current, at this time, the voltage Vd across the two terminals of the switch unit S is equal to 0, and zero-voltage turn-on of the switch unit S can be realized by controlling Gs to be at a high level.

After the switch unit S is turned on, the switching voltage terminal A is grounded to make the level at the switching voltage terminal A be equal to 0, and the voltage $V_L$ across the two terminals of the main inductor L is equal to the voltage $V_{in}$ output from the direct-current power source unit. At this time, the voltage $V_{La}$ across the two terminals of the auxiliary inductor La is calculated by the following formula:

$$V_{La} = 0 - V_L \times N = -N \times V_{in}.$$

Then, the auxiliary inductor La begins to discharge. When the current flowing through the auxiliary inductor La decreases to zero, the unidirectional conduction element 112 cuts off, the current flowing through the auxiliary inductor La is stopped, and the auxiliary switch element 111 can realize zero current turn-off, with no turn-off loss.

FIG. 8 is a schematic diagram illustrating the fourth implementation of the power source assembly provided by the present disclosure, and the power source assembly in this implementation is an isolated power source assembly. In the implementation illustrated by FIG. 8, a main power part is a typical full-bridge isolation circuit, an inverter circuit formed by the main switches S1 to S4 converts a direct-current voltage input by the direct-current power source unit 211 into a high-frequency alternating-current switching voltage, the high-frequency alternating-current switching voltage is isolated by a transformer T1 and then rectified by a bridge rectifier circuit formed by rectifier diodes D1 to D4 to obtain a secondary-side switching voltage, and then the secondary-side switching voltage is subjected to low-pass filtering by the main inductor L and the total output capacitor Co to obtain an isolated output voltage.

In the implementation illustrated by FIG. 8, an output terminal of the secondary-side rectifier circuit is electrically connected to the switching voltage terminal A of the soft switch circuit 300, and a voltage output from the output terminal of the secondary-side rectifier circuit is switched between two levels, namely 0 (an output voltage reference ground) and $V_{in}/N_{T1}$, with $N_{T1}$ being an original ratio of secondary turns of the isolation transformer T1. The first electrode of the total output capacitor serves as the output terminal of the power source assembly, the first electrode of the total output capacitor Co is electrically connected to the second voltage terminal B of the soft switch circuit 300, and the second voltage terminal C of the soft switch circuit 300 is electrically connected to a reference voltage (a reference voltage is a ground voltage in the present implementation).

Figure 9:
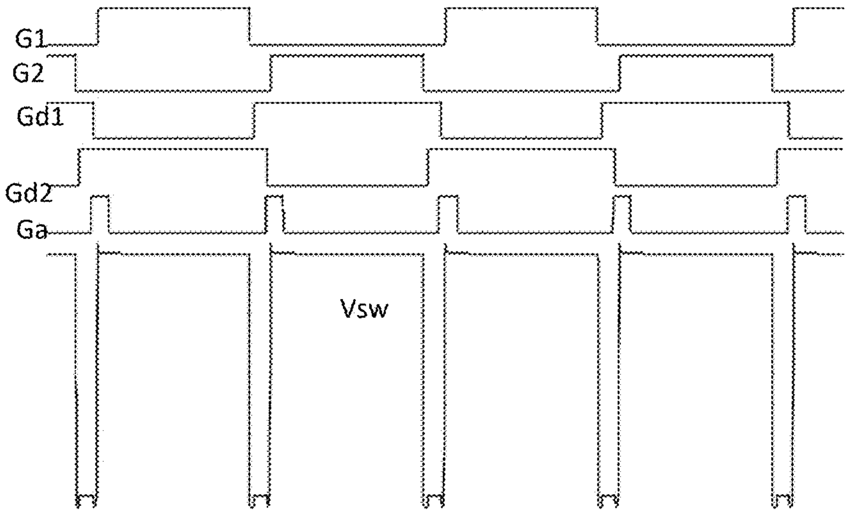
FIG. 9 is a timing diagram of all signals in the power source assembly shown in FIG. 8.

FIG. 9 shows waveforms of control signals for the specific soft switch circuit provided in the implementation illustrated by FIG. 8. In FIG. 9, G1 is a waveform of a control signal for the primary-side main switches S1 and S4, and G2 is a waveform of a control signal for the primary-side main switches S2 and S3. Gd1 is a waveform of a control signal when the secondary-side rectifier diodes D1 and D4 are replaced with synchronous rectifiers, and Gd2 is a waveform of a control signal when the secondary-side rectifier diodes D2 and D3 are replaced with synchronous rectifiers. Ga is a waveform of a control signal for an auxiliary switch diode. Vsw is a waveform of a switching voltage node described in the implementation illustrated by FIG. 8.

Figure 10:
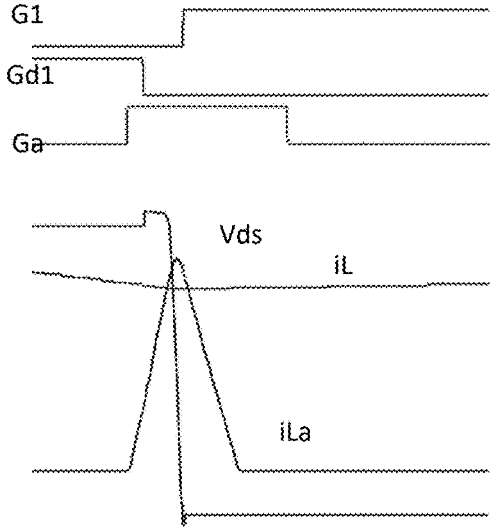
FIG. 10 is a schematic diagram illustrating a current flowing through a main inductor, and a current flowing through an auxiliary inductor in the power source assembly shown in FIG. 8.

Specifically, FIG. 10 shows implemented waveforms of the specific soft switch circuit provided in the implementation illustrated by FIG. 8. Vds is a voltage across two terminals of the primary-side main switch S4, IL is a waveform of the current in the main inductor L, and iLa is a waveform of the current in the auxiliary inductor La.

Before the auxiliary switch element 111 is turned on, the secondary-side rectifier diodes D1 to D4 are turned on, a level of the switching voltage is equal to the secondary-side reference voltage, i.e., 0, the voltage $V_L$ across the two terminals of the main inductor L is equal to (0−Vo), and the current flowing through the main inductor L does not change greatly at an on moment or an off moment because the inductance of the main inductor L is large.

When the auxiliary switch element 111 is turned on, the voltage $V_{La}$ across the two terminals of the auxiliary inductor La is calculated by the following formula:

$$V_{La} = 0 - V_L \times N = V_o \times N.$$

Charging of the auxiliary inductor La begins. When the current iLa flowing through the auxiliary inductor La is greater than the current iL flowing through the main inductor L, the currents flowing through the rectifier diodes D1 to D4 are 0, so that reverse recovery losses of the rectifier diodes can be greatly reduced. When the rectifier diodes are replaced with the synchronous rectifiers, reverse currents begin to flow through the synchronous rectifiers. Then, the control signal Gd2 for the synchronous rectifiers D2 and D3 is switched off, the reverse currents flow through the synchronous rectifiers D1 and D4 and are mapped to a primary winding by the isolation transformer T1 to discharge a parasitic output capacitor of a primary-side switch diode S until the currents discharge to 0, and then parasitic body diodes of the main switch diodes S1 and S4 maintain the currents, at this time, the voltage Vds across the two terminals of the main switch diode S1/S4 is equal to 0, and zero-voltage turn-on of the main switch diodes S1 and S4 can be realized by controlling Gs to be at a high level. With the same process, zero voltage turn-on of the main switches S2 and S3 can be realized in a next cycle.

After S1 and S4 are turned on, the primary winding of the transformer is connected to the positive electrode of the direct-current power source unit 211, a voltage of the primary winding of the transformer is equal to the output voltage $V_{in}$ of the direct-current power source unit 211, a level output from the secondary-side rectifier circuit, i.e., the level at the switching voltage terminal A shown in FIG. 8, is $V_{in}/N_{T1}$, the voltage $V_L$ across the two terminals of the main inductor L is equal to $V_{in}/N_{T1}-V_o$, and the voltage $V_{La}$ across the two terminals of the auxiliary inductor is obtained by the following formula:

$$V_{La} = 0 - (V_{in}/N_{T1} + V_L \times N) = -\left(\frac{1+N}{N_{T1}} V_{in} - N \cdot V_o\right).$$

Then, the auxiliary inductor La begins to discharge. When the current flowing through the auxiliary inductor La decreases to zero, the unidirectional conduction element 112 cuts off, the current flowing through the auxiliary inductor La is stopped, and the auxiliary switch element 111 can realize zero current turn-off, that is, auxiliary switch element 111 has no turn-off loss.

FIGS. 11 and 12 are schematic diagrams illustrating the fifth and sixth implementations of the power source assembly, respectively, provided by the present disclosure. The power source assembly shown in FIGS. 11 and 12 is a reverse non-isolated buck-boost circuit in which the output voltage is reversed with respect to the input voltage through reverse charging or discharging of the main inductor L.

In FIG. 11 and FIG. 12, a node at which the main switch unit S is connected to the anode of the diode D is electrically connected to the switching voltage terminal A of the soft switch circuit 300, so as to enable the voltage of the switching voltage terminal A to be switched between two levels, namely the input voltage $V_{in}$ (when the main switch unit S is turned on) supplied by the direct-current power source unit 211 and the output voltage $V_o$ (when the main switch unit S is turned off). A reference voltage for the input voltage $V_{in}$ and the output voltage $V_o$ is the voltage of the first voltage terminal of the soft switch circuit 300. In FIG. 11, the input voltage $V_{in}$ is the voltage of the first voltage terminal C of the soft switch circuit 300. In FIG. 12, the output voltage $V_o$ is the voltage of the first voltage terminal C of the soft switch circuit 300.

FIG. 13 is a schematic diagram illustrating the seventh implementation of the power source assembly provided by the present disclosure. The power source assembly in FIG.

13 is a switched-capacitor multi-level buck circuit. In this circuit, when the main switch didoes S1 and S3 are turned on, the switched capacitor Cs is connected in series by the input voltage $V_{in}$ to supply power to an output inductor: when the main switch didoes S2 and S4 are turned on, the switched capacitor Cs supplies power to the output inductor, and a voltage of the switched capacitor Cs is half of the input voltage, so that the voltage Vds of the main switch diodes S1 to S4 can be reduced to $V_{in}/2$ by adopting the switched-capacitor multi-level solution, and the circuit is a circuit commonly used in high-voltage and high-power application scenarios. In the implementation illustrated by FIG. 13, a node at which the main switches S2 and S3 are connected to each other is electrically connected to the switching voltage terminal A of the soft switch circuit 300, and the level at the switching voltage terminal A may be switched between three levels, namely the input voltage $V_{in}$ (when S1 and S2 are turned on), $1/2V_{in}$ (when S1 and S3 or S2 and S4 are turned on), and 0 (when S3 and S4 are turned on). The output voltage is the voltage of the second voltage terminal B in the soft switch circuit 300. A reference voltage for the input voltage and the output voltage is the voltage of the first voltage terminal C of the soft switch circuit.

FIG. 14 is a schematic diagram illustrating the eighth implementation of the power source assembly provided by the present disclosure. The power source assembly in FIG. 14 is a multi-level boost circuit. Similar to the implementation illustrated by FIG. 13, a voltage of the switched capacitor Cs is half of the output voltage $V_o$, so that the voltage Vds of the main switch diodes S1 to S4 in the boost circuit can be reduced to $V_o/2$. In the implementation illustrated by FIG. 14, a node at which the main switches S2 and S3 are connected to each other is the switching voltage terminal A of the soft switch circuit 300, and the voltage at the switching voltage terminal A may be switched between three levels, namely the output voltage $V_o$ (when S1 and S2 are turned on), $1/2V_o$ (when S1 and S3 or S2 and S4 are turned on), and 0 (when S3 and S4 are turned on). The input voltage is the voltage at the second voltage terminal B in the soft switch circuit 300. A reference voltage for the input voltage and the output voltage is the voltage at the first voltage terminal C of the soft switch circuit.

FIG. 15 is a schematic diagram illustrating the ninth implementation of the power source assembly provided by the present disclosure. The power source assembly is an application embodiment of a reverse multi-level buck-boost circuit. In FIG. 15, the input voltage $V_{in}$ is a negative voltage, such as −48V commonly used in communication systems, and the power source assembly operates in a way similar to that described in the implementation illustrated by FIG. 11 and FIG. 12, that is, the output voltage is reversed through reverse charging or discharging of the main inductor L. Similar to the implementations illustrated by FIG. 13 and FIG. 14, a voltage of the switched capacitor Cs is half of a difference between the input voltage and the output voltage, so that the voltage Vds of the main switch diodes S1 to S4 can be reduced to $(V_o-V_{in})/2$ through the switched capacitor Cs. In the implementation illustrated by FIG. 15, a node at which the main switches S2 and S3*a* are connected to each other is the switching voltage terminal A of the soft switch circuit 300, and the voltage at the switching voltage terminal A is switched between three levels, namely the output voltage $V_o$ (when S1 and S2 are turned on), $1/2(V_o+V_{in})$ (when S1 and S3 or S2 and S4 are turned on), and the input voltage $V_{in}$ (when S3 and S4 are turned on). A reference voltage for the input voltage and the output voltage is the voltage at the second voltage terminal B in the soft switch circuit 300. The input voltage is the voltage at the first voltage terminal A of the soft switch circuit.

In a third aspect of the present disclosure, there is provided a control method for a soft switch circuit, with the soft switch circuit being the soft switch circuit provided in the first aspect of the present disclosure. The control method includes:

when the switching voltage terminal receives the first level signal, controlling the auxiliary module to be charged with the first voltage input from the first voltage terminal, so as to reduce the current flowing through the switching voltage terminal;

when the switching voltage terminal receives the second level signal, controlling the auxiliary module to discharge to the switching voltage terminal.

The control method is configured to control the soft switch circuit in the power source assembly provided in the second aspect. Since the operation principle of the soft switch circuit is described in detail above, the control method will not be described in detail here.

It should be understood by those of ordinary skill in the art that the functional modules/units in all or some of the operations, the systems and the devices in the method disclosed above may be implemented as software, firmware, hardware, or suitable combinations thereof. If implemented as hardware, the division between the functional modules/units stated above is not necessarily corresponding to the division of physical components: for example, one physical component may have a plurality of functions, or one function or operation may be performed through cooperation of several physical components. Some or all of the physical components may be implemented as software executed by a processor, such as a central processing unit, a digital signal processor or a microprocessor, or may be implemented as hardware, or may be implemented as an integrated circuit, such as an application specific integrated circuit. Such software may be distributed on a computer-readable medium, which may include a computer storage medium (or a non-transitory medium) and a communication medium (or a transitory medium). As well known by those of ordinary skill in the art, the term "computer storage medium" includes volatile/nonvolatile and removable/non-removable media used in any method or technology for storing information (such as computer-readable instructions, data structures, program modules and other data). The computer storage medium includes, but is not limited to, a Random Access Memory (RAM), a Read-Only Memory (ROM), an Electrically Erasable Programmable Read-Only Memory (EEPROM), a flash memory or other memory techniques, a Compact Disc Read Only Memory (CD-ROM), a Digital Versatile Disc (DVD) or other optical discs, a magnetic cassette, a magnetic tape, a magnetic disk or other magnetic storage devices, or any other medium which can be configured to store desired information and can be accessed by a computer. In addition, it is well known by those of ordinary skill in the art that the communication media generally include computer-readable instructions, data structures, program modules, or other data in modulated data signals such as carrier wave or other transmission mechanism, and may include any information delivery medium.

The present disclosure has disclosed the exemplary embodiments using specific terms, but the terms are merely used and should be merely interpreted as having general illustrative meanings, rather than for the purpose of limitation. Unless expressly stated, it is apparent to those of ordinary skill in the art that features, characteristics and/or elements described in connection with a particular embodiment may be used alone or in combination with features, characteristics and/or elements described in connection with other embodiments. Therefore, it should be understood by those of ordinary skill in the art that various changes in the forms and the details may be made without departing from the scope of the present disclosure of the appended claims.

What is claimed is:

1. A soft switch circuit, comprising a switching voltage terminal, a main inductor, and a second voltage terminal, the switching voltage terminal being electrically connected to a first terminal of the main inductor, and the second voltage terminal being electrically connected to a second terminal of the main inductor, wherein the soft switch circuit further comprises an auxiliary module and a first voltage terminal, and the auxiliary module is connected in series between the switching voltage terminal and the first voltage terminal, the auxiliary module comprises an auxiliary inductor and a control unit which is connected in series to the auxiliary inductor, the auxiliary inductor is capable of generating magnetic coupling with the main inductor and generating a coupling voltage with the main inductor, the auxiliary module is configured to be charged with a first voltage input from the first voltage terminal and the coupling voltage generated with the main inductor when the switching voltage terminal receives a first level signal, so as to reduce a current flowing through the switching voltage terminal; and the auxiliary module is further configured to discharge to the switching voltage terminal when the switching voltage terminal receives a second level signal, wherein the first level signal and the second level signal are different from each other;

wherein the control unit comprises an auxiliary switch element, and the auxiliary switch element is connected in series between the auxiliary inductor and the first voltage terminal.

2. The soft switch circuit of claim 1, wherein the control unit is configured to control two terminals of the auxiliary inductor to be connected to the first voltage terminal and the switching voltage terminal, respectively, when the switching voltage terminal receives the first level signal, so as to realize charging of the auxiliary inductor; and the control unit is further configured to control, when the auxiliary inductor discharges under the condition that the switching voltage terminal receives the second level signal, the auxiliary inductor to be disconnected from the first voltage terminal.

3. The soft switch circuit of claim 2, wherein the control unit further comprises a controller the controller is configured to generate and output a first control signal when the switching voltage terminal receives the first level signal, and is further configured to generate and output a second control signal when the switching voltage terminal receives the second level signal; and a control terminal of the auxiliary switch element is electrically connected to an output terminal of the controller, the auxiliary switch element is configured to be turned on when the control terminal of the auxiliary switch element receives the first control signal, and is further configured to be turned off when the control terminal of the auxiliary switch element receives the second control signal.

4. The soft switch circuit of claim 2, wherein the control unit comprises a unidirectional conduction element connected in series with an auxiliary switch element; and the unidirectional conduction element enables the auxiliary inductor to perform unidirectional discharging, and a controller is configured to generate, under the condition that a current in the auxiliary inductor discharges to zero, a second control signal to control the auxiliary switch element to be turned off.

5. The soft switch circuit of claim 4, wherein the unidirectional conduction element is a diode.

6. The soft switch circuit of claim 2, wherein the auxiliary module is further configured to enable the auxiliary inductor to discharge when the switching voltage terminal receives the second level signal, and the control unit controls the auxiliary inductor to be disconnected from the first voltage terminal when a current in the auxiliary inductor crosses zero during discharging.

7. The soft switch circuit of claim 1, wherein the auxiliary inductor is wound around a core of the main inductor.

8. A power source assembly, comprising a main circuit and a soft switch circuit, wherein the soft switch circuit comprises a switching voltage terminal, a main inductor, and a second voltage terminal, the switching voltage terminal being electrically connected to a first terminal of the main inductor, and the second voltage terminal being electrically connected to a second terminal of the main inductor, wherein the soft switch circuit further comprises an auxiliary module and a first voltage terminal, and the auxiliary module is connected in series between the switching voltage terminal and the first voltage terminal, the auxiliary module comprises an auxiliary inductor and a control unit which is connected in series to the auxiliary inductor, the auxiliary inductor is capable of generating magnetic coupling with the main inductor and generating a coupling voltage with the main inductor, the auxiliary module is configured to be charged with a first voltage input from the first voltage terminal and the coupling voltage generated with the main inductor when the switching voltage terminal receives a first level signal, so as to reduce a current flowing through the switching voltage terminal; and the auxiliary module is further configured to discharge to the switching voltage terminal when the switching voltage terminal receives a second level signal, wherein the first level signal and the second level signal are different from each other;

wherein the control unit comprises an auxiliary switch element, and the auxiliary switch element is connected in series between the auxiliary inductor and the first voltage terminal, and the main circuit comprises a power source module, a total output capacitor, and a power output terminal, an output terminal of one of the power source module and a first electrode of the total output capacitor is electrically connected to the switching voltage terminal, an output terminal of the other of the power source module and the first electrode of the total output capacitor is electrically connected to the second voltage terminal, a positive electrode of the power output terminal is electrically connected to the first electrode of the total output capacitor, and a negative electrode of the power output terminal is electrically connected to a second electrode of the total output capacitor.

9. The power source assembly of claim 8, wherein the power source module comprises a direct-current power source unit, a switch unit, and a freewheel diode, a positive electrode of the direct-current power source unit is electrically connected to a first terminal of the switch unit, and a negative electrode of the direct-current power source unit is electrically connected to a reference voltage terminal;

a second terminal of the switch unit is electrically connected to the switching voltage terminal, an anode of the freewheel diode is electrically connected to the reference voltage terminal, and a cathode of the freewheel diode is electrically connected to the switching voltage terminal; and the first electrode of the total output capacitor is electrically connected to the second voltage terminal, and the first voltage terminal is electrically connected to one of the reference voltage terminal and the positive electrode of the direct-current power source unit.

10. The power source assembly of claim 8, wherein the power source module comprises a direct-current power source unit, a switch unit, and a freewheel diode, a positive electrode of the direct-current power source unit is electrically connected to the second voltage terminal, and a negative electrode of the direct-current power source unit is electrically connected to a reference voltage terminal;

one terminal of the switch unit is electrically connected to the switching voltage terminal, and the other terminal of the switch unit is electrically connected to the reference voltage terminal;

an anode of the freewheel diode is electrically connected to one terminal of the switch unit, a cathode of the freewheel diode is electrically connected to the first electrode of the total output capacitor; and the first voltage terminal is electrically connected to the reference voltage terminal.

11. The power source assembly of claim 8, wherein the power source module comprises a direct-current power source unit, an inverter unit, a transformer unit, and a rectification unit, two input terminals of the inverter unit are electrically connected to a positive electrode of the direct-current power source unit and a negative electrode of the direct-current power source unit respectively, an input terminal of the transformer unit is electrically connected to an output terminal of the inverter unit, an output terminal of the transformer unit is electrically connected to an input terminal of the rectification unit, and an output terminal of the rectification unit is electrically connected to the switching voltage terminal.

12. The power source assembly of claim 8, wherein the power source module comprises a direct-current power source unit, a switch unit, and a freewheel diode, a positive electrode of the direct-current power source unit is electrically connected to a reference voltage terminal, a negative electrode of the direct-current power source unit is electrically connected to one terminal of the switch unit, and the other terminal of the switch unit is electrically connected to the switching voltage terminal;

an anode of the freewheel diode is electrically connected to the switching voltage terminal, and a cathode of the freewheel diode is electrically connected to the first electrode of the total output capacitor; and the first voltage terminal is electrically connected to one of the reference voltage terminal and a cathode of the direct-current power source unit, and the second voltage terminal is electrically connected to the reference voltage terminal.

13. The power source assembly of claim 8, wherein the power source module comprises a direct-current power source unit, a switched capacitor, and a plurality of serially connected switch elements, a first electrode of the switched capacitor is electrically connected to an electrical connection node between a first switch element and a second switch element among the plurality of serially connected switch elements, and a second electrode of the switched capacitor is electrically connected to an electrical connection node between a last switch element and a second to last switch element among the plurality of serially connected switch elements;

the switching voltage terminal is electrically connected to an electrical connection node between two switch elements located at middle positions among the plurality of serially connected switch elements, the second voltage terminal is electrically connected to the first electrode of the total output capacitor, and the first voltage terminal is electrically connected to a reference voltage terminal; and a positive electrode of the direct-current power source unit is electrically connected to one terminal of the first switch element among the plurality of serially connected switch elements, and a cathode of the direct-current power source unit is electrically connected to the reference voltage terminal.

14. The power source assembly of claim 8, wherein the power source module comprises a direct-current power source unit, a switched capacitor, and a plurality of serially connected switch elements, a first electrode of the switched capacitor is electrically connected to an electrical connection node between a first switch element and a second switch element among the plurality of serially connected switch elements, and a second electrode of the switched capacitor is electrically connected to an electrical connection node between a last switch element and a second to last switch element among the plurality of serially connected switch elements;

the switching voltage terminal is electrically connected to an electrical connection node between two switch elements located at middle positions among the plurality of serially connected switch elements, the second voltage terminal is electrically connected to a positive electrode of the direct-current power source unit, and the first voltage terminal is electrically connected to a reference voltage terminal; and a cathode of the direct-current power source unit is electrically connected to the reference voltage terminal.

15. The power source assembly of claim 8, wherein the power source module comprises a direct-current power source unit, a switched capacitor, and a plurality of serially connected switch elements, a first electrode of the switched capacitor is electrically connected to an electrical connection node between a first switch element and a second switch element among the plurality of serially connected switch elements, and a second electrode of the switched capacitor is electrically connected to an electrical connection node between a last switch element and a second to last switch element among the plurality of serially connected switch elements;

the switching voltage terminal is electrically connected to an electrical connection node between two switch elements located at middle positions among the plurality of serially connected switch elements, the second voltage terminal is electrically connected to a positive electrode of the direct-current power source unit, and the first voltage terminal is electrically connected to a negative electrode of the direct-current power source unit; and the positive electrode of the direct-current power source unit is electrically connected to a reference voltage terminal.

16. A control method for a soft switch circuit, wherein the soft switch circuit comprises a switching voltage terminal, a main inductor, and a second voltage terminal, the switching voltage terminal being electrically connected to a first terminal of the main inductor, and the second voltage terminal being electrically connected to a second terminal of the main inductor, wherein the soft switch circuit further comprises an auxiliary module and a first voltage terminal, and the auxiliary module is connected in series between the switching voltage terminal and the first voltage terminal, the auxiliary module comprises an auxiliary inductor and a control unit which is connected in series to the auxiliary inductor, the auxiliary inductor is capable of generating magnetic coupling with the main inductor and generating a coupling voltage with the main inductor, the auxiliary module is configured to be charged with a first voltage input from the first voltage terminal and the coupling voltage generated with the main inductor when the switching voltage terminal receives a first level signal, so as to reduce a current flowing through the switching voltage terminal; and the auxiliary module is further configured to discharge to the switching voltage terminal when the switching voltage terminal receives a second level signal, wherein the first level signal and the second level signal are different from each other;

wherein the control unit comprises an auxiliary switch element, and the auxiliary switch element is connected in series between the auxiliary inductor and the first voltage terminal, and the control method comprises:

when the switching voltage terminal receives the first level signal, controlling the auxiliary module to be charged with the first voltage input from the first voltage terminal, so as to reduce the current flowing through the switching voltage terminal;

when the switching voltage terminal receives the second level signal, controlling the auxiliary module to discharge to the switching voltage terminal.

* * * * *